United States Patent
Hale et al.

(10) Patent No.: US 9,818,006 B1
(45) Date of Patent: Nov. 14, 2017

(54) RFID TAG PROGRAMMING IN A DUPLEXER

(71) Applicant: Lexmark International, Inc., Lexington, KY (US)

(72) Inventors: Jason P. Hale, Richmond, KY (US); Donald E. Proffitt, Richmond, KY (US)

(73) Assignee: lexmark International, Inc., Lexington, KY (US)

( * ) Notice: Subject to any disclaimer, the term of this patent is extended or adjusted under 35 U.S.C. 154(b) by 0 days.

(21) Appl. No.: 15/152,672

(22) Filed: May 12, 2016

(51) Int. Cl.
*B41J 3/50* (2006.01)
*G06K 7/10* (2006.01)

(52) U.S. Cl.
CPC .............................. *G06K 7/10198* (2013.01)

(58) Field of Classification Search
CPC .............................. G06K 19/07718; B41J 3/50
USPC .............................. 340/572.1, 10, 51, 13.26
See application file for complete search history.

(56) References Cited

U.S. PATENT DOCUMENTS 8,313,187 B2    11/2012  Barnett et al.
2012/0154471 A1*  6/2012  Ren ........................... B41J 3/60
                                                      347/16

* cited by examiner

*Primary Examiner* — Kevin Kim
(74) *Attorney, Agent, or Firm* — John Victor Pezdek

(57) ABSTRACT

A method of programming an RFID tag in an image-forming device is disclosed. The RFID tag is programmed while media is paused in a duplex media path. The RFID tag is programmed using an antenna located between a simplex media path and the duplex media path. Other methods and systems are disclosed.

5 Claims, 3 Drawing Sheets

RFID TAG PROGRAMMING IN A DUPLEXER

CROSS REFERENCES TO RELATED APPLICATIONS

None.

BACKGROUND

1. Field of the Disclosure

The present invention relates generally to image forming devices and, in particular, to modular units that may be utilized to provide RFID print functionality to an image forming device.

2. Description of the Related Art

Inkjet and laser printers are common in most workplace and home computing environments. Today, many printers may include multi-functional assemblies capable of printing on a large array of print media including letterhead, paper envelopes and labels. Print media may have embedded radio frequency signatures in the form of Radio Frequency Identification (RFID) transponders or tags. These tags, sometimes called "Smart Labels", may be used with a variety of existing printing methods.

Embedded print media may include a backing material (sometimes referred to as the "web") upon which a label is applied, with a RFID tag sandwiched in between the label and the backing material. There may be one or more labels on the web and the sheet, as presented, may be part label and part plain paper. In some cases there may be more than one tag arrayed across the width and down the length of the media such that multiple columns and/or rows of tags are contained on the print media.

Printing on media with embedded RFID tags is a growing area of label printing. Each tag on a sheet may be printed with certain data, and the RFID tag embedded within that media may be used to allow individualized processing of user-associated data. For example, a shipping label might have the delivery address and a package tracking ID printed on it, while the corresponding tag would be programmed with the same information. The delivery information may then be read from the tag, whether or not the package is positioned so that the tag is visible.

It takes some time to program a RFID tag. The tag must remain within the field of the RFID programmer antenna during a programming cycle. As printing speeds increase, the RFID tag programming becomes a bottleneck to system throughput.

SUMMARY

The invention, in one form thereof, is directed to an method of programming a RFID tag located on a first sheet of media in an imaging device having a simplex path and a duplex path for feeding media. The method includes imaging a first side of the first sheet of media by passing the first sheet through the simplex path; pausing the first sheet in the duplex path and programming the RFID tag while the first sheet is paused; imaging a first side of a second sheet of media by passing the second sheet through the simplex path; imaging a second side of the first sheet of media by passing the first sheet through the simplex path; and imaging a second side of the second sheet of media by passing the second sheet through the simplex path.

The invention, in another form thereof, is directed to an imaging device having a simplex media path that passes through an image transfer station; a duplex media path that connects to the simplex media path upstream and downstream of the image transfer station; and a RFID programming antenna located such that a section of the duplex media path passes within the programming field of the RFID programming antenna.

The invention, in yet another form thereof, is directed to a duplex module for an imaging device having a duplex media path; and a RFID programming antenna positioned to program a RFID tag located within the duplex media path. The duplex module is configured to couple to an imaging device without the use of tools.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

The present disclosure relates to a device, system, method and article for providing radio frequency identification (RFID) functionality to an image forming device. An image forming device may be understood as any device capable of providing images. Such devices may include fax machines, copiers, printers, multi-function device or all-in-one devices and may utilize electrophotographic, inkjet, solid ink, thermal transfer and other printing systems. The RFID functionality may be provided by a removable module, which may be attached or removed from the image forming device. For example, the removable module may be encased in a housing for ease of connectivity with the printer, it may include alignment features to engage with the printer and or electrical connections that may be keyed to engage and communicate with the image forming device controller. RFID functionality may include the ability to read and/or program RFID tags, which may be embedded in or positioned on a sheet of media. Media may include paper, fabric, films and other substrates or carriers upon which an image may be formed.

Figure 1:
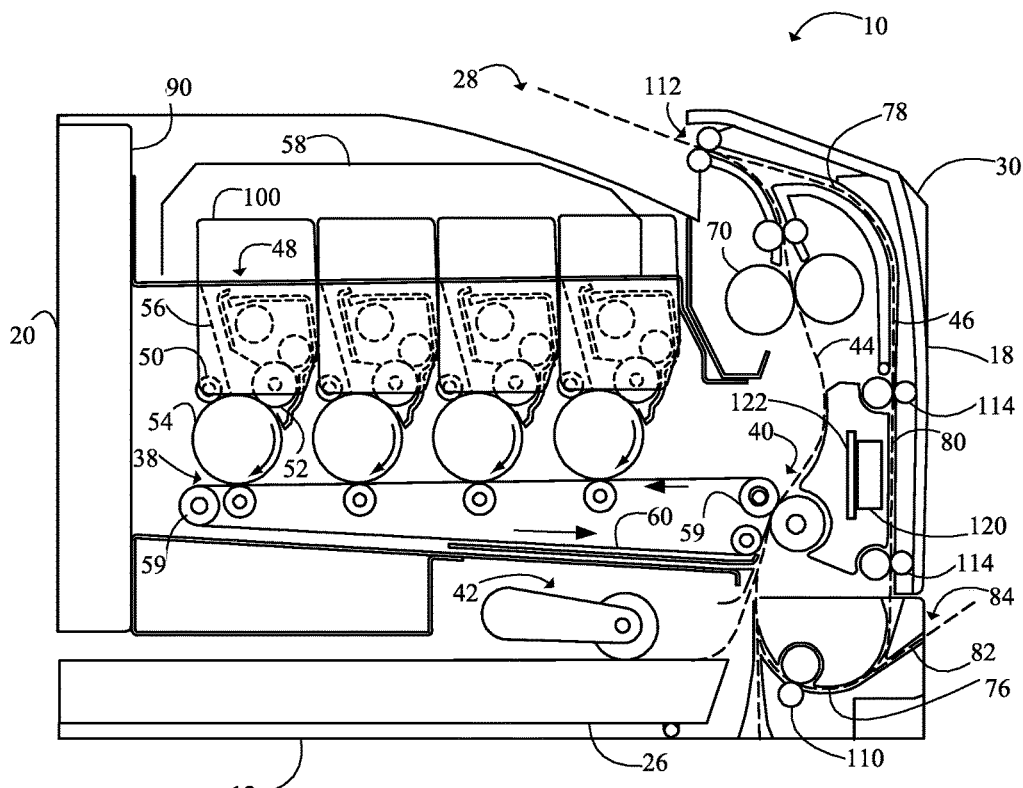
FIG. 1 is a side view depiction of an image-forming device.

In FIG. 1, there is shown a representative imaging device, such as a color laser printer, indicated generally by the numeral 10. The imaging device 10 includes a body 12 having a top, a bottom, a front 18, a back 20, a first side and a second opposing side. The device 10 may include a media input tray 26 sized to contain media, and a media output area 28. It is understood that the imaging device 10 may include more than one input tray 26. A control panel 30 is accessible from the exterior to control the operation of the imaging device 10.

Imaging device 10 further includes a first toner transfer area 38, a second transfer area 40, a pick mechanism 42, a simplex path 44, and a duplex path 46. The first toner transfer area 38 includes one or more imaging units 48 that may be aligned horizontally extending from the front 18 to the back 20 of the body 12. Each imaging unit 48 includes a charging roll 50, a developer roll 52, and a rotating photoconductive (PC) drum 54. The charging roll 50 forms a nip with the PC drum 54, and charges the surface of the PC drum 54 to a specified voltage, such as −900 volts, for example. A laser beam 56 from print head 58 contacts the surface of the PC drum 54 and discharges those areas it contacts to form a latent image. In one embodiment, areas on the PC drum 54 illuminated by the laser beam 56 are discharged to approximately −300 volts. The developer roll 52, which also forms a nip with the PC drum 54, is biased to about −600 volts and develops negatively charged toner particles from a cartridge or toner reservoir 100 to the PC drum 54 to form a toner image. The toner particles are attracted to the areas of the PC drum 54 surface discharged by the laser beam 56.

In one embodiment, a separate toner reservoir 100 is operatively connected to each of the imaging units 48. The toner reservoirs 100 are sized to contain toner that is transferred from the imaging units 48 for image formation. The toner reservoirs 100 may be mounted and removed from the device 10 independently from the imaging units 48. In one embodiment, the toner reservoirs 100 each contain one of black, magenta, cyan, and yellow toner. In one embodiment, each of the toner reservoirs 100 is substantially the same. In another embodiment, the toner reservoirs 100 include different capacities. In one specific embodiment, the toner reservoir that contains black toner has a higher capacity.

The imaging device 10 also includes an intermediate transfer mechanism (ITM) 60 horizontally disposed below the imaging units 48. In this embodiment, the ITM 60 is formed as an endless belt trained about a plurality of support rollers 59. However, in other embodiments, ITM 60 may be formed as a rotating drum. During image forming operations, the ITM 60 moves in the direction of the arrows past the imaging units 48. One or more of the PC drums 54 transfers toner images in their respective colors to the ITM 60. In one embodiment, a positive voltage field attracts the toner image from the PC drums 54 to the surface of the moving ITM 60. The ITM 60 then conveys the toner images to the second transfer area 40, which transfers the toner image to a media sheet, such as a sheet of paper, for example.

The media input tray 26 is sized to contain a stack of media sheets. The pick mechanism 42 is positioned adjacent to the media input tray 26 for moving an uppermost media sheet from the media input tray 26 toward the front 18 of the body 12 and into the simplex path 44. In this embodiment, the pick mechanism 42 includes a roller that moves the media sheets from media input tray 26 towards the second transfer area 40 located towards the front 18 of the body 12. In one embodiment, the pick mechanism 42 is positioned in proximity (i.e., less than a length of a media sheet) to the second transfer area 40 with the pick mechanism 42 moving the media sheets from the input tray 26 to the second transfer area 40.

The simplex path 44 extends between the media input tray 26 and discharge rollers 112. In this embodiment, the simplex path 44 has a substantially mirror imaged C-shape. Particularly, the simplex path 44 may include a first curved section that extends between the pick mechanism 42 and the second toner transfer area 40, a partly vertical section that extends between the second transfer area 40 and a fuser assembly 70, and a second curved section that extends between the fuser assembly 70 and the output media area 28. In the example embodiment, the partly vertical section extends along the front 18 of the body 12, and is disposed between the duplex media path 46 and the ITM 60. A deflector may be disposed at the front 18 of the body 12 to guide the media sheets towards the fuser assembly 70.

The duplex media path 46 may also have a substantially mirror imaged C-shaped, and extends along the front 18 of the body 12 between the output media area 28 and the first curved section of the initial media path 44. Duplex media path 46 includes a series of rollers 114 for moving media sheets. In this embodiment, the duplex path 46 includes a lower curved section 76, an upper curved section 78, and a generally vertical section 80 that is connected between the upper and lower curved sections 76, 78. The generally vertical section 80 extends along the front 18 of the body 12.

In the example embodiment, the lower curved section 76 shares a common media path with another feed path 82. In one embodiment, feed path 82 includes an inlet 84 for manually inserting the media sheets, and one or more rollers that move the sheets to the second transfer area 40.

Discharge rollers 112, which may include two (FIG. 1) or three (FIG. 2) rollers, are located downstream from the fuser assembly 70 and may be rotated in either forward or reverse directions. In a forward direction the discharge rollers 112 move the media sheet from the initial media path 44 toward the media output area 28. For duplex printing, as the trailing edge of a media sheet is near discharge rollers 112, the discharge rollers 112 reverse direction and move the media sheet into the duplex media path 46.

The device 10 also includes controller 90 to control the operation of the device 10, including image formation and motor engagement/disengagement. In one embodiment, controller 90 comprises one or more printed circuit boards (PCBs) having one or more microprocessors, random access memory, read only memory, and an input/output interface. In this embodiment, controller 90 is disposed at the back 20 of the body 12.

Duplex media path 46 may include sets of rollers for controlling the movement of media sheets within the duplex path. A first set of rollers 110 may be disposed near the end of the duplex media path 46. The second set of rollers 112, which may also serve as exit rollers for moving media sheets to output area 28 from the simplex path 44, may be disposed near the beginning of the duplex media path 46. Additional sets of rollers 114 may be disposed between the first set 110 and the second set 112 along the duplex media path 46.

In an example embodiment, the second set of rollers 112 includes at least one driven roller individually controlled by the controller 90. The second set of rollers 112 may be controlled to move media sheets from the fuser assembly 70 to either output media area 28 or duplex media path 46. In this regard, during a duplex printing operation, the second set of rollers 112 may be controlled by controller 90 to rotate in both directions to move media sheets in a "peek-a-boo" manner as discussed in U.S. Pat. No. 7,130,574, assigned to the assignee of the present disclosure, the content of which is hereby incorporated by reference herein in its entirety.

The first set of rollers 110 may include a driven roller individually controlled by the controller 90 to move media sheets through the upstream end of the duplex media path 46 and towards the second transfer area 40. In addition or the alternative, one or more of the sets of rollers 114 may include a driven roller that is controlled by the controller 90. The controller 90 may control the driven roller(s) of the sets of rollers 114 independently of the control of the driven roller of the first set of rollers 110. This independent control may facilitate the leading edge of a media sheet being relatively precisely positioned at the immediate upstream side of first set of rollers 110, after which movement of the media sheet through first set of rollers 110 and towards the second transfer area 40 may be relatively precisely controlled. Alternatively, the controller 90 controls the driven roller(s) of the sets of rollers 114 and the driven roller of the first set of rollers 110 in a similar or the same way.

When duplex printing a multi-page job, media sheets may pause in the duplex path 46. For example, when printing a four-sided two-page duplex job, the first side of the first sheet is imaged first. Then the first sheet is fed out the discharge rollers 112 then pulled back into the discharge rollers 112 into the duplex path 46 and pauses in the duplex path 46 while the first side of the second sheet is imaged. The second sheet is transferred to the duplex path 46 via the discharge rollers 112 while the second side of the first sheet is imaged. Note that the media sheets are flipped by the action of the discharge rollers 112 feeding the sheets into the duplex path 46. The first sheet is ejected into the media output area 28 while the second side of the second sheet is imaged. Finally, the second sheet is ejected into the media output area 28. This process maximizes the overall throughput of multi-page duplexed jobs.

The first media sheet may contain one or more RFID tags. The tag may be programmed while the first sheet is paused in the duplex path 46 using a RFID programming antenna 120 located adjacent to the duplex path 46. A RFID tag must remain in the antenna's programming field during the programming operation, which takes some period of time. If the programming time is less than the duplex pause, then no reduction in throughput occurs due to programming the RFID tag.

The antenna 120 is preferably located between the simplex path 44 and the duplex path 46 so that the antenna's programming field faces away from the simplex path 44 to avoid accidentally programming an RFID tag on a sheet in the simplex path 44 while programming an RFID tag on a sheet in the duplex path 46. Alternatively, the antenna 120 may be located outside of the loop formed by the simplex path 44 and the duplex path 46. Preferably, a shield 122, such as a grounded metal plate, is located between the antenna 120 and the simplex path 44 to block stray programming fields from reaching the simplex path 44. Other shield configurations are known in the art such as, for example, a metal screen.

Figure 2:
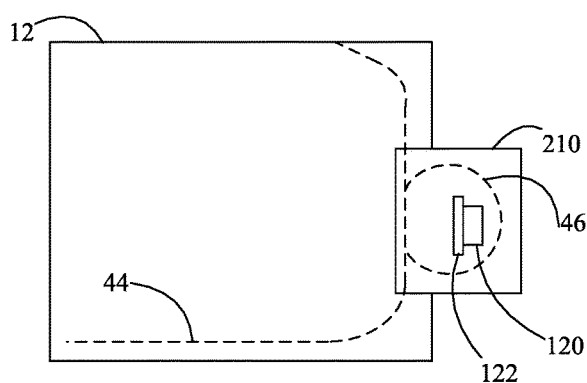
FIG. 2 is a block diagram depiction of a duplex module coupled to an image-forming device.

FIG. 2 shows a duplex module 210 coupled to the image device body 12. The duplex module 210 includes the duplex path 46, the antenna 120, and the shield 122. The duplex path 46 and the simplex path 44 operate as described above. The duplex module 210 is configured to couple to the image device body 12 without the use of tools. For example, the duplex module 210 contains alignment pins that mate with holes in the image body 12 and is secured with a finger-operated latch. Other coupling mechanisms may be used as are known in the art.

Figure 3:
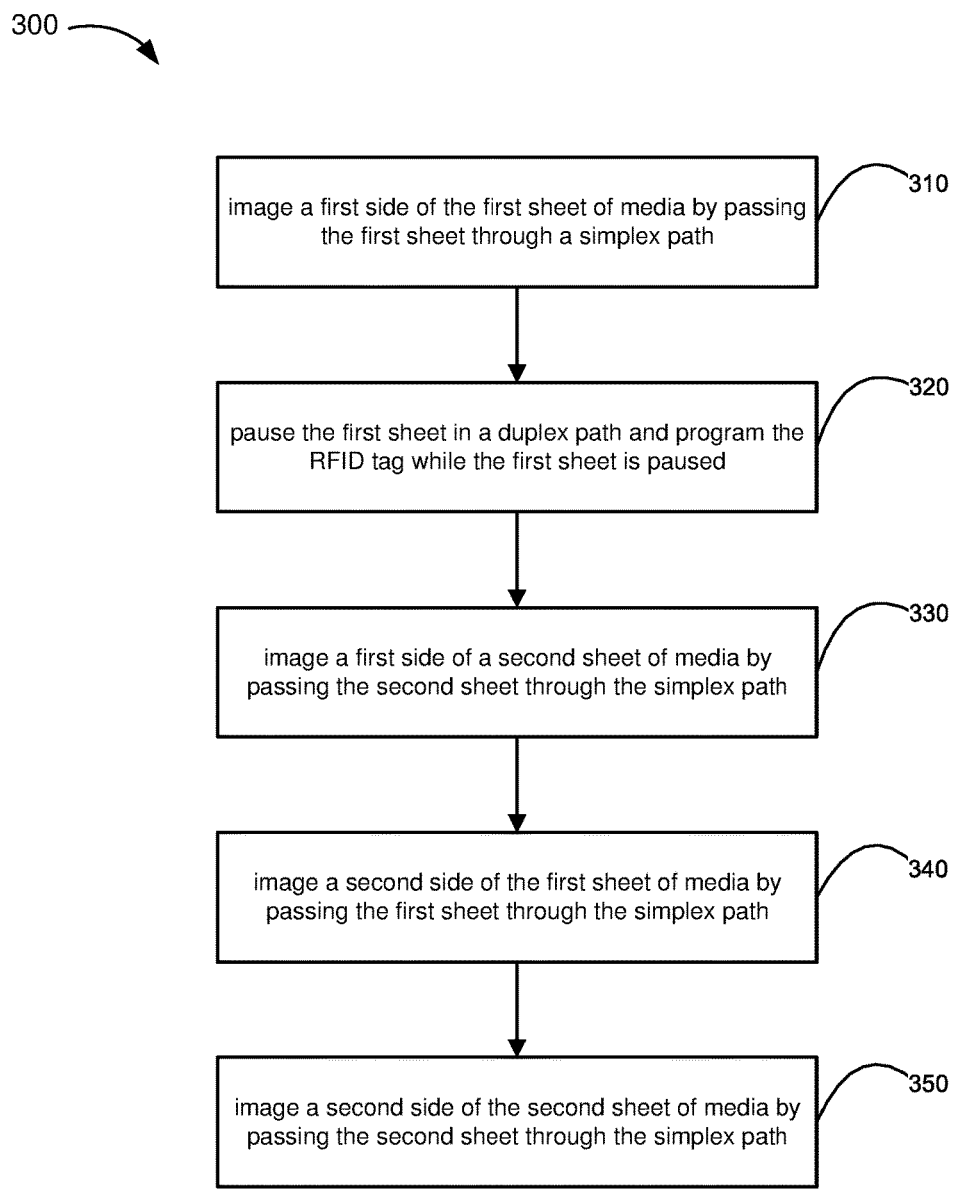
FIG. 3 is a flowchart of a method of programming an RFID tag.

FIG. 3 is a flow chart of a method according to one embodiment of the present invention. The method 300 programs a RFID tag in an imaging device having a duplex path and a simplex path. The method programs the RFID tag while it is in the duplex path and avoids causing a bottleneck to system throughput during duplex jobs.

At block 310, the first side of a first sheet of media is imaged by passing the first sheet through a simplex path. The first sheet has an RFID tag.

At block 320, the first sheet is paused in the duplex path. The RFID tag is programmed while the first sheet is paused.

At block 330, a first side of a second sheet of media is imaged by passing the second sheet through the simplex path. At block 340, a second side of the first sheet of media is imaged by passing the first sheet through the simplex path. At block 350, a second side of the second sheet is imaged by passing the second sheet through the simplex path. The blocks of method 300 may be performed in alternate sequences, simultaneously, etc. For example, block 320 may be performed simultaneously with block 330 to improve throughput.

Figure 4:
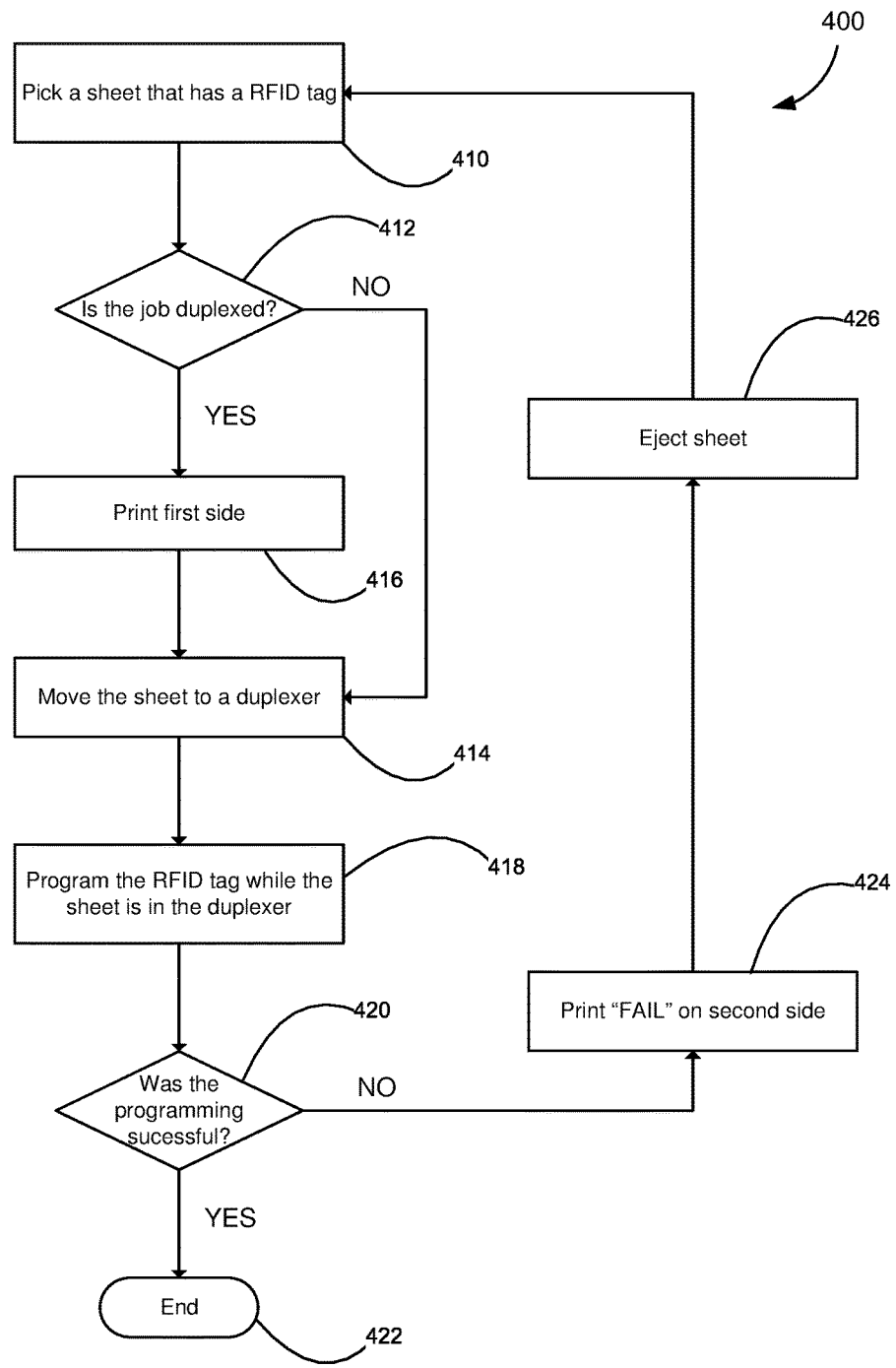
FIG. 4 is a flowchart of a method of programming an RFID tag.

FIG. 4 is a flow chart of a method according to one embodiment of the present invention. The method 400 programs a RFID tag in an imaging device having a duplex path and a simplex path. The method programs the RFID tag while it is in the duplex path and avoids causing a bottleneck to system throughput during duplex jobs.

At block 410, a sheet of media that has a RFID tag is picked from a stack of media located in a media tray. At block 412, it is determined whether the job is duplexed. If the job is not duplexed, at block 414 the sheet is moved to a duplexer. For example, the sheet may be transported in a "peek-a-boo" manner as described above. If the job is duplexed, at block 416 the first side of the sheet is printed and at block 414 the sheet is moved to the duplexer.

At block 418, the RFID tag is programmed while the sheet is in the duplexer. At block 420, it is determined whether the programming was successful. If yes, the method ends at block 422. If the programming was not successful, at block 424 "FAIL" is printed on the second side of the sheet. At block 426, the sheet is ejected and at block 410 a new sheet is picked to retry the programming operation.

It should be appreciated that the functionality described herein for the embodiments of the present invention may be implemented by an article, such as hardware, software, or a combination of hardware and software, either within the printer or copier or in the RFID module, as desired. If implemented by software, a processor and a machine-readable medium may be required. The processor may be of any type of processor capable of providing the speed and functionality required by the embodiments of the invention and may include, for example, a controller or microcontroller. Machine-readable medium includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on medium in either a compressed and/or encrypted format.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. For example, duplex systems that are not "peek-a-boo" are known in the art and may alternatively be used instead of the "peek-a-boo" duplex system in FIG. 1. Relatively apparent modifications include combining one or more features of various embodiments with features of other embodiments.

What is claimed is:

1. A method of programming a RFID tag located on a first sheet of media in an imaging device having a simplex path and a duplex path for feeding media, the method comprising:
   imaging a first side of the first sheet of media by passing the first sheet through the simplex path;
   pausing the first sheet in the duplex path and programming the RFID tag while the first sheet is paused;
   imaging a first side of a second sheet of media by passing the second sheet through the simplex path;
   imaging a second side of the first sheet of media by passing the first sheet through the simplex path; and
   imaging a second side of the second sheet of media by passing the second sheet through the simplex path.

2. An imaging device comprising:
   a simplex media path that passes through an image transfer station;
   a duplex media path that connects to the simplex media path upstream and downstream of the image transfer station;
   a RFID programming antenna located such that a section of the duplex media path passes within the programming field of the RFID programming antenna; and
   a RF shield located between the RFID programming antenna and a section of the simplex media path.

3. The imaging device of claim 2, wherein the RFID programming antenna is located between the simplex media path and the duplex media path.

4. A duplex module for an imaging device having a simplex media path, the duplex module comprising:
   a duplex media path;
   a RFID programming antenna positioned to program a RFID tag located within the duplex media path; and
   a RF shield located between the RFID programming antenna and a section of the simplex media path,
   wherein the duplex module is configured to couple to the imaging device without the use of tools and the duplex media path is configured to couple to the simplex media path when the duplex module is coupled to the imaging device.

5. The imaging device of claim 2, further comprising a duplex module having the duplex media path and including the RFID programming antenna wherein the duplex module is configured to couple to the imaging device without the use of tools.

* * * * *